INVENTOR
J. F. O'NEILL JR.
BY J. P. Kearns
ATTORNEY

United States Patent Office 3,423,529
Patented Jan. 21, 1969

3,423,529

AUTOMATIC PHASE RECOVERY IN SUPPRESSED CARRIER QUADRATURE MODULATED BITERNARY COMMUNICATION SYSTEMS

John F. O'Neill, Jr., Eatontown, N.J., assignor to Bell Telephone Laboratories, Incorporated, New York, N.Y., a corporation of New York Filed Feb. 1, 1966, Ser. No. 524,136
U.S. Cl. 178—68 12 Claims
Int. Cl. H04b 1/06

ABSTRACT OF THE DISCLOSURE

Automatic phase control of the demodulating carrier wave in a suppressed carrier quadrature modulated synchronous digital data transmission system is facilitated where biternary encoding is employed in the respective quadrature channels. Biternary encoding produces zero crossings at sufficient numbers of sampling instants to permit the monitoring of crosstalk between quadrature channels. Correlation of such crosstalk with the phase of the demodulating carrier wave then directs incremental phase adjustment in the proper direction to minimize any phase error present adaptive to time variations in channel characteristics.

This invention relates generally to quadrature carrier data transmission systems and specifically to automatic phase control of a synchronous demodulating carrier wave in such a system.

It is a principal goal of data transmission design engineers to pack the maximum information content into finite bandwidth transmission channels. A promising way to fully exploit the information capacity of a communication system without wasting bandwidth is quadrature carrier transmission. In this system the individual data symbols of a synchronous serial binary train are transmitted in pairs. The paired symbols are double-sideband amplitude modulated onto the two quadrature phases of a single carrier wave. The symbol rate is then half that which would have been used for normal single-channel single-sideband transmission and thus does not violate Nyquist's criteria, but each symbol now has twice the information content of an ordinary binary symbol because four possible phase states are available in each symbol.

This equivalent information rate is obtained, moreover, while producing no change in the tolerance of the system to noise. Sensitivity to noise effects demands, as does the single-channel system, precise attention to control of the amplitude and phase of the received signal. Particularly, to avoid crosstalk between the quadrature signaling channels the demodulating carrier wave must be carefully synchronized with the transmitting carrier wave, even though it was suppressed at the transmitter. One technique for synchronizing the modulating and demodulating carrier waves in quadrature carrier systems is to reinsert a carrier wave component at reduced level in the transmitted signal. However, this technique has the disadvantage of requiring the removal of direct-current and low-frequency energy from the modulating data signals. Then, too, direct-current restoration circuits must be provided at the receiver.

Another technique is to supply out-of-band pilot tones to the transmitted signal. The frequencies of these tones can be chosen to be mutually compatible with the transmitting carrier frequency and the serial data transmission rate. The necessary increase in overall signaling bandwidth is minimized, however, and with careful design can be kept at zero. This technique is adopted in establishing the environment for the present invention.

In any synchronous demodulation system for data there exists the problem of 180-degree phase ambiguity in reconstructing a demodulating carrier, whether pilot tones are transmitted or not. In the present exemplary quaternary data transmission system the problem of phase ambiguity in the demodulating carrier, which may not arise initially but occur after a line interruption, is rendered moot by biternary encoding of data signals on each channel.

In biternary encoding an original nonreturn-to-zero binary signaling train is precoded into another binary signaling train with transitions related to the occurrence of binary elements of one form only, marking signals, for example. The second binary signaling train has the same information content and bit rate as the original train, but the highest baseband frequency for a random data train can be reduced in the following way. When this second train is applied to a transmission channel whose bandwidth is equal to this highest allowable frequency (equal to half the bit rate), a three-level biternary signal results because the response time of the channel is only one half the bit interval. Each signal level in the biternary train is effectively equal to the algebraic sum of the present and past binary levels of the second binary train. Because of the precoding, however, the three biternary levels have unconditional binary significance in terms of the orginal binary train in that the center level represents the binary element of the form, i.e., marking signal, selected in the precoding process and each outer level represents the binary element of the other form, i.e., spacing signal. Thus, a folding over of the received biternary signal about its center level and regeneration about some new level slightly displaced from this center level repoduces the original binary train. In effect the information capacity of the transmission channel is raised beyond that of its ordinary binary capacity.

When the biternary signal is modulated onto one of the carrier waves for the two quadrature channels, the center level is represented by the absence of sideband energy and the outer levels appear as phase reversals of the carrier wave. Since the outer levels have the same binary significance, however, the actual carrier phase at either 0° or 180° is equally acceptable. Either of the outer levels is therefore represented by the presence of sideband energy.

An important advantage is obtained from the biternary encoding. The transmitted biternary signal requires much less than the bandwidth of the original binary signal for satisfactory transmission. The combination of biternary encoding with quadrature phase modulation, as employed here, yields a significant improvement in bandwidth utilization over ordinary binary transmission by any other modulation scheme. Particularly important in the practice of this invention is that sideband energy is completely absent from the channel when one form of binary signal is present thus enabling comparison of the departure of the phase of the other channel from that of the demodulating carrier wave during data transmission. Any other message format employing an odd number of levels has this same property.

Accordingly, it is a principal object of this invention to adjust the phase of the demodulating carrier in a dual-channel quadrature phase data transmission system on a continuous basis during the transmission of message data.

It is another object of this invention to adjust the phase of the demodulating carrier in a quadrature phase data transmission system adaptively based on a correlation between the signal energy present in the respective quadrature channels.

It is a further object of this invention to effect incremental phase corrections in the phase of the demodulating carrier wave in a quadrature phase data transmission system based on correlating the signal energy in the respective quadrature channels.

According to this invention, the phase of the demodulating carrier wave in the receiver for a quadrature carrier data transmission system is continuously and adaptively adjusted in phase by discrete increments based on a correlation of the signal energies present on the respective quadrature carrier channels. The transmitted signal comprises two suppressed-carrier double-sideband channels derived from carrier waves of the same frequency but quadrature phase accompanied by two out-of-band pilot tones whose sum frequency is equal to twice that of the suppressed carrier wave. The binary data signals modulated on the respective carrier waves are precoded into second binary data trains whose transitions are determined by the presence of binary bits of one form only. These second data trains are converted into biternary form by reason of the spectral shaping of transmission channels of finite bandwidth, or by the use of filters in the data terminals.

At the receiver the composite signal including the out-of-band pilot tones is amplified in an automatic-gain controlled amplifier. A carrier is reconstructed from the pilot tones in a conventional manner and applied through an incrementally adjustable phase-shift network to separate channel demodulators. The demodulated waves are filtered, sliced and correlated to determine intervals of nominally zero energy in either channel. When there is nominally zero energy in one of the channels any actual energy detected in that same channel is due to crosstalk from the other channel and constitutes a measure of the deviation in phase of the demodulating carrier from the carrier originally modulated at the transmitter. Logical correlation between the analog demodulated signals in each channel and detected binary digital signal determines the polarity of this deviation.

The binary data trains in each channel are reconstructed in biternary detectors, which are simply implemented by full-wave rectifiers and intermediate level slicers. A logical combination of the slicer outputs with the recovered data bits yields absolute indications of whether the demodulating carrier lags or leads the original carrier in phase. These latter indications are averaged in reversible counters to avoid unnecessary corrections based on noise. A full count in either of these counters causes an incremental adjustment of the phase shifting network in the demodulating carrier circuit. By iteration this process brings the demodulating carrier wave in the appropriate phase condition within the granularity of the increment chosen for the phase-shift network. Since the phase corrections are based on monitoring the respective message data trains, the correction process is continuously adaptive to time variation in channel characteristics.

An important feature of this invention is the complete digitalization of all functions related to the phase correction of a synchronous demodulating carrier wave.

Another feature is the implementation of a phase-shift network by the combination of a reversible binary counter and a bank of capacitors of binarily related capacitance values.

Still another feature of this invention is that only the algebraic sign of the deviation of the demodulating carrier from the correct phase need be determined, and not its absolute magnitude.

An advantage of this invention is that automatic adaptive phase correction of a synchronous demodulating carrier wave makes practicable the realization of the bandwidth conserving capabilities of quadrature carrier transmission and biternary encoding simultaneously in a single transmission system by allowing an accurate demodulating carrier to be maintained.

Other objects, features and advantages of this invention will become apparent upon consideration of the following detailed description and the drawing in which.

Figures 1, 2:
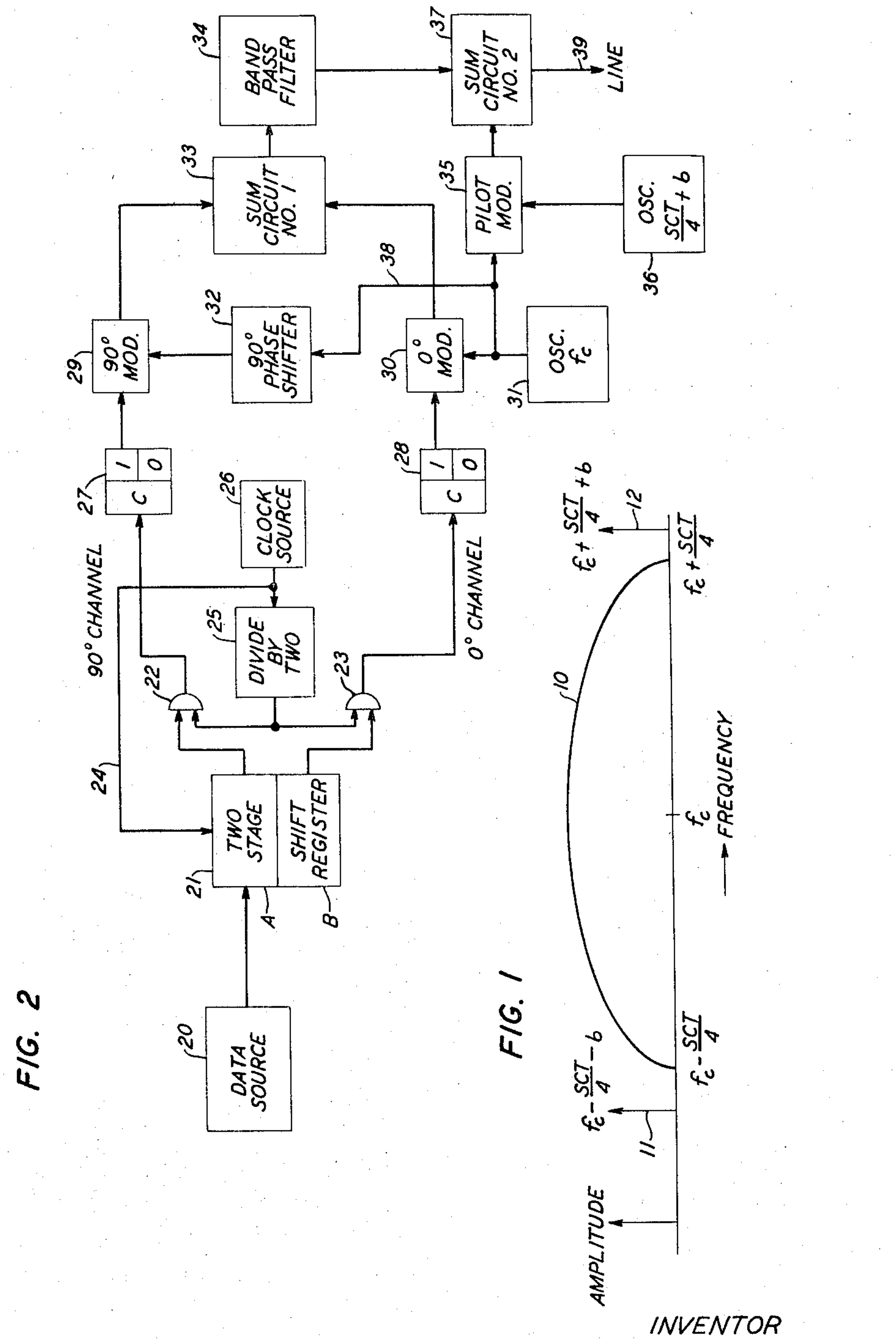
FIG. 1 is a frequency diagram of the transmitted spectrum of the biternary-encoded quadrature carrier data transmission system to which this invention is applicable.
FIG. 2 is a block schematic diagram of an illustrative embodiment of a transmitting terminal for a quadrature carrier data transmission system to which this invention is applicable.

FIG. 1 represents the transmitted frequency spectrum 10 occupied by a quadrature carrier data transmission system centered about a carrier frequency $f_c$. The abscissa represents frequency and the ordinate, amplitude. The maximum energy is statistically present at the location of the carrier frequency $f_c$ at the center of the spectrum. Response to sideband frequencies decays in continuous fashion to the outer limits of the band at locations $f_c \pm SCT/4$, SCT is an abbreviation for "serial clocking timing," and is the data rate in bits per second. The band edges occur at these frequencies because of the combination of quadrature carrier modulation with biternary encoding. By conventional single-channel double-sideband amplitude modulation techniques this same bandwidth would handle a binary data signal at only one-fourth SCT. Pilot tones 11 and 12 are supplied at the band edges to facilitate synchronous demodulation at the receiver. These tones are shown separated from the band edges by the small frequency $b$ to enable detection without any phase jitter. In jitter-tolerant systems $b$ may be reduced to zero.

For purposes of illustration the spectrum shown in FIG. 1 is assumed to be a telephone carrier group band in the normal range of 60 to 108 kilocycles per second with the carrier frequency $f_c$ located at 84 kilocycles per second. To avoid distortion and crosstalk only 36 kilocycles of the 48-kilocycle group band are used. The band edges are therefore located at 66 and 102 kilocycles, and SCT equals 72 kilocycles for an overall data rate of 72 kilobits per second. The pilot tone separation from the band edges may advantageously be on the order of $b$=400 cycles. The sum frequency of the pilot tones becomes $2f_c$ for all values of $b$. The difference frequency is 36 kilocycles, the symbol rate of the individual channels, plus 2$b$. For $b=0$, the difference frequency is the exact symbol rate per channel. These figures are illustrative of a wide-band data channel. The invention, however, is not to be considered limited to this particular frequency band.

FIG. 2 depicts a transmitter for generating a carrier-suppressed quaternary line signal with accompanying pilot tones from which an automatic-phase-corrected demodulating carried can be derived. The transmitter comprises a binary data source 20, a serial clock timing source 26, quadrature-related channels of modulation including differential encoders 27 and 28 and balanced modulators 29 and 30, a carrier-wave source 31, a pilot-wave source 36, pilot-wavemodulator 35, summing circuits 33 and 37 and channel shaping filter 34. A signal in the form of a conventional nonreturn-to-zero serial binary pulse train is supplied by data source 20 to two-stage shift register 21 where the serial bits are aligned in pairs. The contents of the input stage A are continually shifted to stage B under the control of pulses from clock source 26 over lead 24 at the serial bit rate. As a practical matter clock source 26 and data source 20 must be synchronized. The pulse rate of clock source 26 is divided by two in block 25 to obtain sampling pulses at the channel timing rate. The outputs of stages A and B of shift register 21 are supplied to sampling coincidence gates 22 and 23, respectively. These gates are enabled at the channel timing rate by the output of divider 25, as shown. As a result samples of the odd data bits of the original serial binary train appear at the output of gate 22 as a second data train. Similarly, samples of the even data bits of the original binary train appear at the output of gate 23 as a third data train. If a mark or a "one" in the original data train is represented by a positive voltage and a space or a "zero" is represented by zero voltage, the outputs of gates 22 and 23 will comprise separate parallel trains of trigger pulses, each of which indicates a mark or "one" in the original binary train. Spaces or "zeroes" in the original train do not appear in the sample pulse trains.

The trigger pulse trains thus obtained from sampling the paired bits of the original binary train in gates 22 and 23 are respectively applied to complementing flip-flops 27 and 28. Each trigger pulse incident on these flip-flops causes a change of output state in a well known manner. The outputs of these flip-flops are new binary data trains whose transitions correspond to marking data bits of the original data train. These conversions constitute differential precoding of the original binary train which facilitate further conversion into a biternary line signal, each level of which will have unconditional binary significance in terms of the original binary signaling train.

The new binary signal trains in the outputs of flip-flops 27 and 28 are modulated in a conventional manner on quadrature carrier waves of frequency $f_c$ in modulators 29 and 30. Carrier wave source 31 supplies an in-phasing modulating carrier directly to 0° modulator 30 and by way of lead 38 and 90° phase shifter 32, a quadrature modulating carrier to 90° modulator 29. Modulators 29 and 30 are preferably balanced to suppress the carrier waves. The two outputs of modulators 29 and 30 are combined in summing circuit 33, which may be any suitable linear adder. The combined output of summing circuit 33 is shaped in bandpass filter 34 to provide a band-limited line signal. The characteristics of filter 34 are chosen so that the overall response spectrum of the transmitted signal is of the appropriate shape shown in FIG. 1. If the bandwidth of the transmission channel and filter are the same as the bit rate of the precoded signal trains, then the combined output signal will be forced into biternary form as is explained in more detail in the copending patent application of E. R. Kretzmer, Ser. No. 441,197, filed Mar. 19, 1965, now U.S. Patent No. 3,388,330 issued June 11, 1968.

To the quadrature carrier signal in the output of filter

34 a pair of band edge pilot tones are added in summing circuit 37. For this purpose pilot-wave oscillator 36 provides a tone at one-fourth the serial clock timing (SCT) frequency plus an arbitrary small offset frequency $b$ for separation from the band edge. This oscillator frequency may be derived from clock source 26 for convenience. The offset frequency $b$ chosen depends on the presence of phase jitter in the transmission system as previously explained. The output of oscillator 36 is modulated with the carrier frequency $f_c$ from carrier-wave oscillator 31 in balanced pilot modulator 35 by well known means. These pilot tones are preferably transmitted at reduced levels to avoid wasting signal power.

Line 39 thus transmits the composite signal represented by the spectrum of FIG. 1. This composite signal comprises a first biternary data channel double-sideband modulated on a suppressed in-phase carrier component, a second biternary data channel double-sideband modulated on a suppressed quadrature-phase carrier component and two band-edge pilot tones spaced from the in-phase carrier frequency by plus and minus one-fourth the serial data rate of the original binary data train and a permissible small offset frequency $b$. The composite signal is transmitted over a suitable transmission medium by wire or radio paths.

Figures 3, 4:
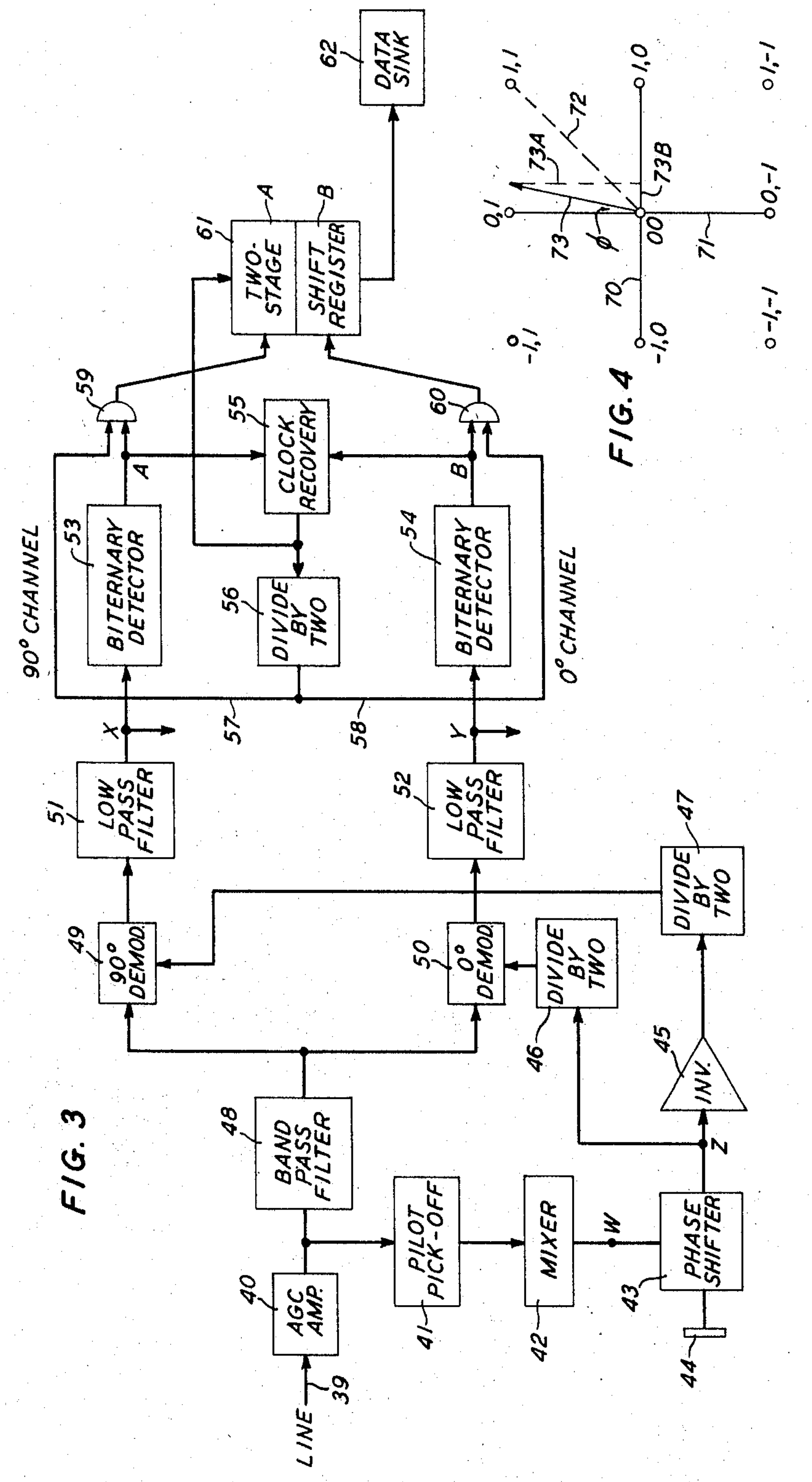
FIG. 3 is a block schematic diagram of an illustrative embodiment for a receiving terminal for a quadrature carrier data transmission system to which this invention is applicable.
FIG. 4 is a vector diagram of quadrature carrier line signals useful in explaining the theory of operation of this invention.

A representative receiver for such a composite signal is shown in FIG. 3. The receiver comprises automatic gain control amplifier 40; a bandpass filter 48, a pilot pickoff channel further including tuned pickoffs 41, mixer 42, adjustable phase shifter 43, inverter 45 and frequency dividers 46 and 47; a 0° demodulator channel further including demodulator 50, low-pass filter 52, biternary detector 54 and coincidence gate 60; a 90° demodulator channel further including demodulator 49, low-pass filter 51, biternary detector 53 and coincidence gate 59; a clock recovery circuit 55 supplemented by frequency divider 56; two-stage shift register 61; and data sink 62. Automatic-gain control amplifier 40 standardizes the amplitude of the received composite signal in a conventional manner based on monitoring one or both of the pilot tones or chosen signal properties. Bandpass filter 48 may advantageously match filter 34 in the transmitter of FIG. 2, and removes the effects of out-of-band noise and pilot tones.

Pilot pickoff 41 may advantageously comprise a pair of narrow-band filters at the pilot tone frequencies. The recovered frequencies are added together in mixer 42 to yield a component at point W at twice the frequency of the suppressed carrier. Mixer 42 is tuned to select this sum component over the difference component. Phase-shifter 43 includes a resistance-capacitance network to compensate for any phase displacement caused by the transmission medium. For purposes of this part of the description manual control 44 is provided to adjust phase shifter 43. The output of phase shifter 43 at point Z is frequency divided by two in block 46 to furnish an in-phase demodulating carrier wave to 0° demodulator 50. The same output at point Z is inverted in block 45 and again divided by two in block 47 to furnish a quadrature phase demodulating carrier wave to 90° demodulator 49. Demodulators 49 and 50 are conveniently conventional balanced circuits. Their outputs are filtered in circuits 51 and 52 to remove any carrier components in normal fashion.

The baseband biternary waves at points X and Y are detected in biternary detectors 53 and 54. Each of these may comprise either a full-wave rectifier and a midlevel slicer circuit or two slicers, one at a positive level and the other at a negative level. The biternary signal is such that the center level is unconditionally a marking bit and either outer level is a spacing bit. In this way the carrier 180° ambiguity problem is obviated. More detail on the detection of precoded biternary signals is given in the aforesaid Kretzmer patent application.

Clock recovery circuit 55 generates a clocking pulse train at the serial data rate of the original binary message signal. It may be synchronized if necessary from the pilot tones in conventional fashion, particularly if offset frequency $b$ were set at zero. Its output is frequency divided by two in block 56 and applied by way of leads 57 and 58 to coincidence gates 59 and 60. These two-input gates have as other inputs the detected binary data trains from detectors 53 and 54. Their outputs are series of pulses corresponding to the marking bits in the detected data trains. The output of gate 59 corresponds to the odd bits in the original transmitted data train and the output of gate 60, to the even bits in the original data train. From these two trains the original data train is reconstructed in two-stage shift register 61. The odd bits from gate 59 are applied to first stage A and the even bits, to second stage B. The contents of stage B are then continually shifted into data sink 62 (receiving customer's equipment) at the serial clock timing rate under the control of clock recovery circuit 55 as shown. Data sink 62 thus receives the reconstructed original serial data train.

In digital data systems, as distinguished from analog systems, the phase of the demodulating carrier is of paramount importance, particularly when the effective data rate is comparable with the bandwidth of the transmitting channel. As little as a six-degree error in the demodulating carrier causes crosstalk between quadrature channels to be down only 20 decibels from the desired signal. The margin against crosstalk has been found to decrease as the sine of the carrier phase error increases.

In the system so far described this carrier error must be monitored by direct observation and manual adjustments made for each transmission path used. This system provides adjustable phase shifter 43 with manual control 44 for this purpose. In practical transmission systems the phase shift may drift with time and require continuous monitoring during message transmission. In a switched communication system new transmission paths are continually being established and taken down. Data calls, particularly at high speed, are generally of short duration. Therefore, the magnitude of the task of adjusting and readjusting a manual phase shifter would become burdensome indeed and consume a disproportionate amount of time per call. Most likely standardized starting sequences would be required as each new transmission path is established to obtain reasonable assurance that the message data would be correctly received.

This invention turns the biternary encoding formate in combination with a quadrature carrier transmission system to account to effect an adaptive automatic phase control system.

FIG. 4 is a vector diagram of the quadrature carrier transmission system. Horizontal axis 70 represents the locus of the in-phase carrier vector. A full amplitude vector pointing to the right (1, 0) encodes the positive outer level of the in-phase biternary signal and the same amplitude vector pointing to the left (−1, 0) encodes the negative outer level thereof. Vertical axis 71 similarly represents the locus of the quadrature phase carrier vector. An upward pointing vector (0, 1) encodes the positive outer level of the biternary quadrature channel signal and a downward pointing vector (0, −1), the negative outer level. When outer biternary levels are encoded simultaneously the resultant vectors are at 45° positions. For example, resultant vector 72, terminating at point (1, 1) represents the two positive outer levels of the in-phase and quadrature-phase biternary signals. The other encoding combinations are indicated by points labeled (−1, 1), (−1, −1) and (1, −1). Center levels on both channels correspond to the absence of any line signal. It is seen that there are nine possible vector positions at sampling instants when the demodulating carrier is in exact phase position.

Any phase misalignment in the demodulating carrier will result in a vector at some position other than one of the nine correct positions. For example, vector 73 represents a misaligned vector leading the correct position by a small angle, assuming the vectors are rotating clockwise. The angle $\varphi$ between the vertical axis and the vector 73 is greatly exaggerated for illustrative purposes. This vector can be resolved into a vertical component 73A and a horizontal component 73B, and can be detected as a (0, 1) vector by the biternary detector in the 90° channel. The vector 73B, however, represents crosstalk into the 0° channel. The slicer thresholds in each channel are assumed to lie at mid-amplitude between the center (0, 0) point and the outer points on the diagram. It is obvious that a phase error of 45° would be detected as a marking signal in each channel.

The basis for the phase correction system of this invention is that the small component of a misaligned vector in one channel which appears in the other channel when there is nominally no signal in the latter channel can be taken as a measure of the direction of the phase error. Zero-level slicers are used to determine the polarities of both components of misaligned vectors. This information, when correlated with the data outputs of the biternary detectors, yields a measure of the direction of the phase error of the demodulating carrier, i.e., whether the misaligned vector leads or lags the correct phase position. According to this invention, the correlation information is used to effect incremental adjustments of the phase shift network 43 in FIG. 3.

The requirements for automating a phase recovery system from a correlation between the analog outputs of the low-pass filters following the channel demodulators and the digital outputs of the biternary detectors can be analyzed as follows:

Let $A_R$ and $B_R$ be the analog amplitudes of quadrature-phase and in-phase channel vectors at any given instant. Let $\varphi$ be the phase error angle (between the vector 73 and the vertical axis, for example, in FIG. 4). The algebraic sign of this angle will be considered positive if leading (as in FIG. 4), and negative if lagging, the correct position. Then, the resultant component on the quadrature-phase vertical axis will be $$A_R' = A_R\cos\varphi + B_R\sin\varphi \qquad (1)$$

Similarly, the resultant component on the in-phase axis (horizontal) will be $$B_R' = B_R\cos\varphi - A_R\sin\varphi \qquad (2)$$

Equations 1 and 2 indicate that there will usually be a second crosstalk component on each axis when $\varphi$ is other than zero. It is apparent that when $\varphi$ is zero, $A_R' = A_R$ and $B_R' = B_R$. $A_R$ and $B_R$ are ideally restricted to the values +1, 0 and −1. In biternary encoding these levels correspond to a binary space for either of the levels +1 and −1 and to binary mark for the level 0. The three biternary levels are available at the outputs of the demodulators (points X and Y in FIG. 3) and the two binary levels, at the outputs of the biternary detectors (points A and B in FIG. 3). When the output of one and only one of the biternary detectors is a binary 1, then any output detected in the other is a distortion or crosstalk component. Such latter output is detected in a zero level slicer and compared with the polarity of the analog output of the one signaling channel in an exclusive-OR circuit. The exclusive-OR circuit, as is well known, yields an output of one binary form when its two inputs are of opposite binary form and an output of the other binary form otherwise. The output of the exclusive-OR circuit provides an indication of the quadrant in which the misaligned vector lies. The logical correlation of the output of the exclusive-OR circuit with the outputs of the biternary detectors then results in signals indicating the sign of the phase error angle, i.e., whether it leads or lags the correct phase position.

The logic of such correlation can be understood from the following tabulation of all possible signaling conditions:

TABLE I

| Sign φ | $A_R$ | $B_R$ | A | B | $B_R$sgn φ | $-A_R$sgn φ | a | b | C | ABab |
|---|---|---|---|---|---|---|---|---|---|---|
| −1 | −1 | −1 | 0 | 0 | +1 | −1 | 0 | 0 | 0 | 0000 |
| −1 | −1 | 0 | 0 | 1 | 0 | −1 | 0 | 0 | 0 | 0100 |
| −1 | −1 | +1 | 0 | 0 | −1 | −1 | 0 | 1 | 1 | 0001 |
| −1 | 0 | −1 | 1 | 0 | +1 | 0 | 1 | 0 | 1 | 1010 |
| −1 | 0 | 0 | 1 | 1 | 0 | 0 | ? | ? | ? | 11?? |
| −1 | 0 | +1 | 1 | 0 | −1 | 0 | 0 | 1 | 1 | 1001 |
| −1 | +1 | −1 | 0 | 0 | +1 | +1 | 1 | 0 | 1 | 0010 |
| −1 | +1 | 0 | 0 | 1 | 0 | +1 | 1 | 1 | 0 | 0111 |
| −1 | +1 | +1 | 0 | 0 | −1 | +1 | 1 | 1 | 0 | 0011 |
| +1 | +1 | +1 | 0 | 0 | +1 | −1 | 1 | 1 | 0 | 0011 |
| +1 | +1 | 0 | 0 | 1 | 0 | −1 | 1 | 0 | 1 | 0110 |
| +1 | +1 | −1 | 0 | 0 | −1 | −1 | 1 | 0 | 1 | 0010 |
| +1 | 0 | +1 | 1 | 0 | +1 | 0 | 1 | 1 | 0 | 1011 |
| +1 | 0 | 0 | 1 | 1 | 0 | 0 | ? | ? | ? | 11?? |
| +1 | 0 | −1 | 1 | 0 | −1 | 0 | 0 | 0 | 0 | 1000 |
| +1 | −1 | +1 | 0 | 0 | +1 | +1 | 0 | 1 | 1 | 0001 |
| +1 | −1 | 0 | 0 | 1 | 0 | +1 | 0 | 1 | 1 | 0101 |
| +1 | −1 | −1 | 0 | 0 | −1 | +1 | 0 | 0 | 0 | 0000 |

The eighteen rows of Table I identify all possible phase error conditions as related to the nine vector positions of FIG. 4. The first column is either plus 1 or minus 1 to indicate a respective leading or lagging phase error angle. The next two columns, headed $A_R$ and $B_R$, represent the biternary signal states of the quadrature and in-phase signaling channels as defined in Equations 1 and 2. The columns headed A and B next represent the binary equivalents of the $A_R$ and $B_R$ columns as obtained from biternary detectors. The columns headed $B_R$sgn φ and $-A_R$sgn φ represent the products indicated and are equivalent to the second distortion component terms in Equations 1 and 2. Columns *a* and *b* represent the binary equivalents of the analog signals on the respective quadrature and in-phase channels such as would be obtained from zero-level threshold or slicing circuits in these channels and coded as "1" for a positive slice and "0" for a negative slice. Column *a* results from Equation 1 and column *b*, from Equation 2. Where $A_R$ or $B_R$ is nonzero, the corresponding *a* or *b* value is its binary equivalent. Where $A_R$ and $B_R$ is zero, the corresponding *a* or *b* is the binary equivalent of the distortion term in the $B_R$sgn φ and $-A_R$sgn φ columns. Where $A_R$, $B_R$, $B_R$sgn φ, and $-A_R$sgn φ are all zero, the *a* and *b* values are indeterminate. The *a* and *b* values of real interest are those obtained when the corresponding $A_R$ or $B_R$ is zero. Then *a* and *b* represent the sign of the distortion component alone. Column C is the binary equivalent of an exclusive-OR comparison of columns *a* and *b*. A "1" in column C represents a misaligned vector in either the upper left or lower right quadrant of FIG. 4 and a "0," a misaligned vector in one of the other two quadrants. The last column contains four-digit binary numbers encoding columns A, B, *a* and *b*.

Of real interest in Table I are those rows in which either $A_R$ or $B_R$, but not both, is zero. These are the even rows above and below the horizontal line separating positive and negative values of sgn φ. The even rows above the line are cases indicating a lagging phase error angle and those below the line, a leading phase error angle. Collecting those above the line in logic equation form yields:

$$\text{Lag}=A'Ba'b'+A'Bab+AB'a'b+AB'ab' \quad (3)$$

By factoring, Equation 3 becomes $$\begin{aligned}\text{Lag}&=A'B(a'b'+ab)+AB'(a'b+ab')\\&=A'B(a\oplus b)'+AB'(a\oplus b)\end{aligned} \quad (4)$$

These equations have the usual logical significance. The encircled plus sign represents modulo two addition, the exclusive-OR function. The terms in parentheses have therefore the values of column C. Thus, Equation 4 can be further reduced to $$\text{Lag}=A'BC'+AB'C \quad (5)$$

Similarly, the usable rows below the line can be collected to indicate leading phase error angle as follows:

$$\begin{aligned}\text{Lead}&=A'Ba'b+A'Bab'+AB'a'b+AB'ab\\&=A'B(a\oplus b)+AB'(a\oplus b)'\\&=A'BC+AB'C'\end{aligned} \quad (6)$$

Figure 5:
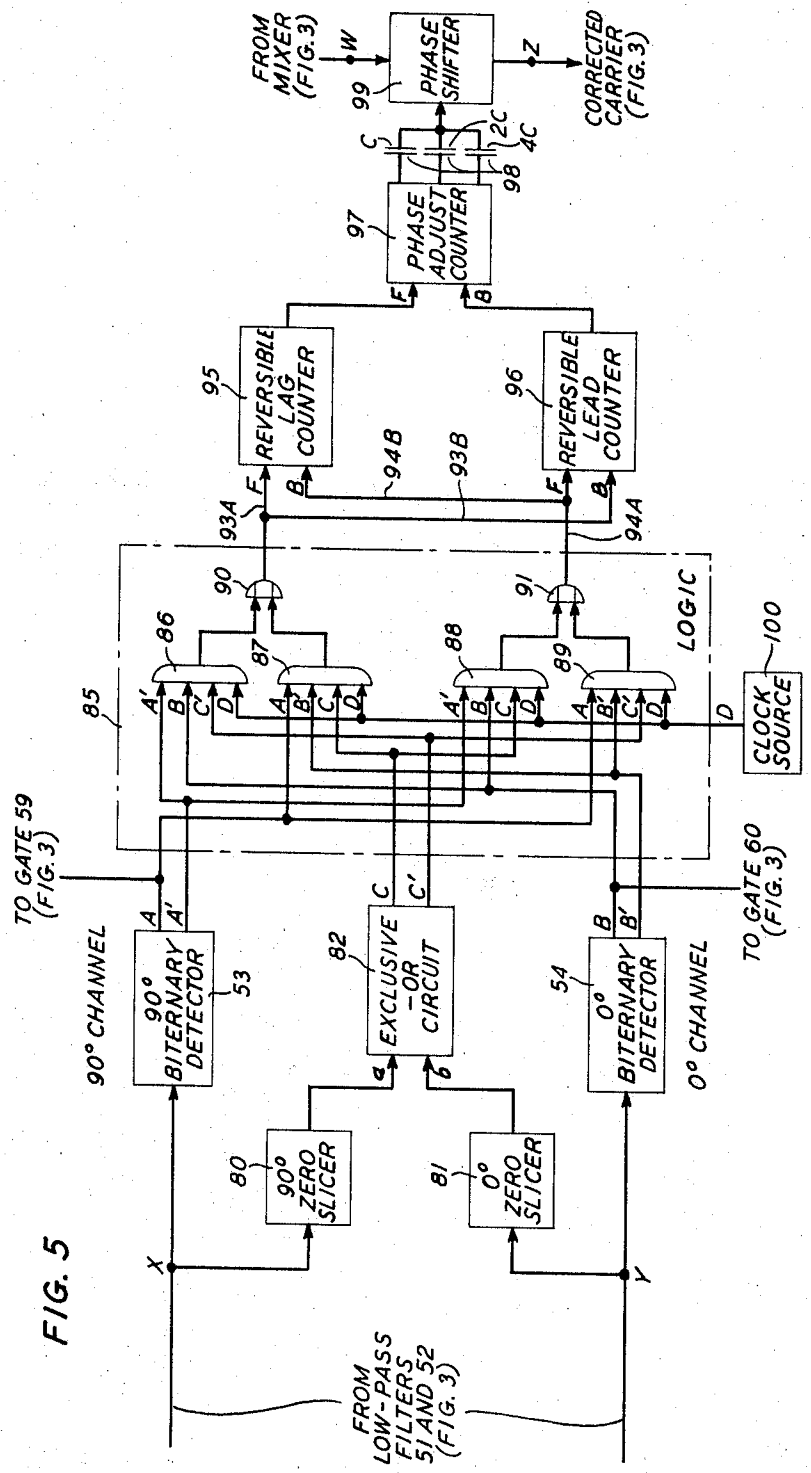
FIG. 5 is an illustrative embodiment in block schematic form of the automatic phase recovery system of this invention.

Equations 5 and 6 can be implemented in a practical system by the arrangement of FIG. 5 which is an applique to the receiver of FIG. 3. The demodulated baseband biternary signals from the outputs of low-pass filters 51 and 52 in FIG. 4 at points X and Y are brought respectively to 90° zero-level slicer 80 and 0° zero-level slicer 81. These slicers are conventional trigger circuits and produce the results tabulated in columns *a* and *b* of Table I. The outputs of slicers 80 and 81 are combined in exclusive-OR circuit 82. Examples of the latter circuit are described in "Pulse and Digital Circuits" by Millman and Taub (McGraw-Hill Book Company, New York 1956) at page 411 with particular reference to FIG. 13–25 thereat. The output of exclusive-OR circuit 82 corresponds to column C of Table I. The A and B columns of Table I are obtained from the outputs of biternary detectors 53 and 54, which are reproduced in FIG. 5. A, B and C outputs, together with a clock signal from source 100, are logically combined in accordance with Equations 5 and 6 in the broken line enclosed rectangle 85. Clock source 100 merely represents a composite of clock recovery circuit 55 and frequency-division circuit 56 of FIG. 5. Its output is at the channel timing rate, half the serial binary rate of the original data signal.

Logic circuit 85 comprises four coincidence or AND-gates 86 through 89 and buffer or OR-gates 90 and 91. AND-gates 86 through 89 implement the four terms on the right sides of Equations 5 and 6 in a straightforward manner. OR-gates 90 and 91 combine the outputs of AND-gates 86–87 and 88–89. Their outputs represent respectively the solutions of Equations 5 and 6. Obviously, there are no outputs from OR-gates 90 or 91 when the detected outputs are both "1" or both "0".

FIG. 5 further comprises reversible binary counters 95 and 96, phase-adjust counter 97 and capacitor bank 98. All three counters can advantageously be three-stage binary counters of conventional form. Counter 95 receives phase error lagging outputs from OR-gate 90 on lead 93A and phase error leading outputs from OR-gate 91 on lead 94B. Similarly and symmetrically, counter 96 receives phase error leading outputs from OR-gate 91 on lead 94A and phase error lagging outputs from OR-gate 90 on lead 93B. Inputs at F cause a forward or up count and inputs at B, a backward or down count. Whenever one counter is set, the other is reset. Counters 95 and 96 therefore perform an averaging function. An overflow from either counter after eight successive up counts indicates a persistence of lagging or leading phase error. Such overflows cause corresponding up and down counts in phase-adjust counter 97. The latter counter serves to ground one or more of the capacitors in bank 98. These capacitors have binary-weighted values as indicated on the drawing. The other terminals are connected at a common point to phase-shifter 99, which then replaces manually controlled phase shifter 43 in FIG. 3. Block 99 includes an appropriate resistor to effect, with capacitors 98, incremental phase adjustment of the recovered demodulating carrier from mixer 42 at point W in FIG. 3. Its output contains the corrected demodulating carrier at point Z, also shown in FIG. 3.

The automatic phase recovery system of this invention presupposes an initial pilot tone phase error less than 22.5°. Performance would be uncertain for greater phase error. Therefore, a training period preceding message transmission may be required in case of an improbable phase error of this magnitude. During such a training period a short quasi-random data sequence on one channel only would suffice to bring the pilot-tone-derived phase within the range of the adaptive system. No change in the receiver would be required, however, and reverse channel communication from receiver to transmitter would be unnecessary. Phase errors exceeding 22.5° would be corrected during such a training period in an obvious manner.

The implementation of certain features of this invention are intended solely for the purposes of illustration. More or fewer stages, for example, may be included in the lag, lead and phase-adjust counters, depending on the requirements for granularity of adjustment. While the use of biternary encoding of the data signals on each channel greatly facilitates implementation of the logic circuitry because a three-level signal (or any odd-level encoding) provides a built-in zero reference level, the principle of the invention can be readily adapted to any data format, including the conventional binary format, by those skilled in the art. A binary format, however, would necessarily place stringent requirements on gain control of the received signals. The spirit and scope of this invention will be more clearly defined in the appended claims.

What is claimed is:

1. In a data communications system in which a serial binary data train with alternate elements encoded into separate signaling trains and modulated onto respective quadrature carrier waves of the same frequency accompanied by band edge pilot tones whose sum frequency is equal to twice the suppressed carrier frequency, an adaptive phase recovery arrangement for a receiver in such system comprising means recovering a demodulating carrier wave from said pilot tones, demodulating means cooperating with said carrier-recovery means for reconstructing said separate signaling trains, polarity-determining means operating on the reconstructed separate signaling trains, comparison means having a binary output indicative of like or unlike outputs from said polarity-determining means, detecting means for said separate reconstructed signaling trains, correlating means jointly responsive to said detecting means and comparison means having outputs representing the algebraic sign of the phase error difference between the demodulating carrier wave from said recovering means and the transmitting carrier wave, averaging means separately responsive to the signs of the outputs from said correlating means, an incrementally adjustable phase shift circuit in series between said recovering means and said demodulating means, and means changing the increment of adjustment of said phase shift circuit responsive to said averaging means indicating a persistence of the sign of the phase error in the positive or negative sense for a preassigned minimum number of samples.

2. The data communications system set forth in claim 1 in which said recovering means comprises means separating said pilot tones from a composite received signal, means for adding said separated pilot tones to form a resultant at twice the frequency of the transmitted carrier wave, and means for frequency dividing opposite phases of said resultant frequency by two to form in-phase and quadrature phases of a demodulating carrier wave.

3. The data communications system set forth in claim 1 in which said polarity-determining means comprise zero-level slicing circuits.

4. The data communications system set forth in claim 1 in which said comparison means comprises an exclusive-OR gate having a binary output of one form for inputs of the same sense and a binary output of another form otherwise.

5. The data communications system set forth in claim 1 in which said correlating means comprises four four-input single-output AND gates, two two-input single-output OR gates, circuit means pairing the outputs of said AND gates in two groups and connecting each group to the inputs of one each of said OR gates, a clock source, and further circuit means connecting said clock source to one input of each of said AND gates, the complementary outputs of each of said detecting means to one input of one AND gate in each of said groups such that binary outputs of opposite form only from said detecting means are connected to inputs of the same AND gates, and the complementary outputs of said comparison means to one input of one AND gate of each group, the outputs of the respective OR gates indicating whether the demodulating carrier wave leads or lags the transmitting carrier wave.

6. The data communications system set forth in claim 1 in which said averaging means comprise reversible multistage binary counters having inputs arranged so that a forward count on one counter is accompanied by a backward count on the other and a significant output appears on either counter after a fixed number of successive forward counts on that counter.

7. The data communications system set forth in claim 1 in which said adjustable phase shift circuit comprises a single resistance element in series between input and output terminals thereof, and a bank of capacitors related to each other as the increasing powers of two selectively connectable singly or in parallel combination across said output terminals.

8. The data communications system set forth in claim 1 in which said increment changing means comprises a reversible multistage binary counter having forward and backward count inputs connected to respective ones of said averaging means and outputs from each stage connected to said phase shift circuit.

9. The data communications system set forth in claim 1 in which each of said separate signaling trains is encoded on three levels and the center level corresponds to a binary signal of one form and each outer level corresponds to a binary signal of the other form.

10. The data communications system set forth in claim 9 in which the separate three-level signaling trains are amplitude modulated onto respective quadrature phases of carrier waves of the same frequency, the outer levels of said signaling trains being represented by opposite phases of the respective carrier waves and the center level being represented by the absence of carrier energy.

11. In combination, a transmitting terminal for information signals of one binary form clocked at regular intervals, a channel having an operating bandwidth substantially less than that required for transmitting ordinary binary information, and a receiving terminal including means for sampling at said intervals and reconverting the output of said channel into binary information:

said transmitting terminal further including means for modulating signals of said one binary form occurring at odd intervals on an in-phase component of a carrier wave centered in said operating bandwidth and signals of said one binary form occurring at even intervals on a quadrature-phase component of the same carrier wave, means for suppressing said carrie wave, means for adding out-of-band pilot tones separated from the center of said operating bandwidth by the frequency of the suppressed carrier wave plus and minus one-fourth the reciprocal of said regular interval and a guard-band offset frequency, and a bandpass filter shaping the transmitted wave to form a pair of three-level signals in quadrature with each other in biternary form;

said receiving terminal including means for reconstructing a demodulating carrier wave from said transmitted pilot tones, demodulating means operating on the wave transmitted over said channel in conjunction with in-phase and quadrature components of said demodulating wave to recover the two information signals in biternary form, biternary detectors operating on said biternary information signals to convert the two extreme levels to one binary form and the center level to the other, and clock-controlled means for combining the two detected information signals into a single serial binary train corresponding to the original transmitted signal;

said receiving terminal further including an incrementally adjustable phase shift network in tandem between said demodulating-wave reconstructing means and said demodulating means, polarity-determining slicer means operating on the biternary signals from said demodulating means, comparison means forming a modulo-two addition of the outputs of said slicer means as an indication of the quadrant in which the phase error of said demodulating carrier lies, a logic circuit correlating said comparison means and said biternary detectors to produce binary outputs corresponding to whether said demodulating carrier wave leads or lags the transmitting carrier wave, lag and lead reversible binary counter means for the outputs of said logic circuit, a forward count on one of said counters being accompanied by a backward count on the other and a full count on either counter commanding an incremental adjustment of said phase-shift network, a phase-adjust reversible binary counter with set and reset inputs driven by said lag and lead counters, and a bank of binary weighted capacitors each having one terminal connected to said phase-shift network and the other terminals connected to count outputs of said phase-adjust counter.

12. In a receiver for a dual-channel suppressed-carrier quaternary data transmission system having binary signals encoded on each channel on at least three levels, means for recovering a properly phased demodulating carrier wave comprising, a local carrier wave generator whose frequency is derived from out-of-band pilot tones in the received signal, said carrier wave generator having in-phase and quadrature-phase outputs, an incrementally adjustable phase-shift circuit in the output of said oscillator, demodulating means controlled by said respective in-phase and quadrature-phase outputs reducing encoded signals on each channel to multilevel baseband form, comparison means operative on the baseband signals from said demodulating means having a significant output only when the respective baseband signals are of opposite polarity, detecting means converting said multilevel baseband signals to binary form, logic circuitry correlating said detected binary signals with the output of said comparison means as a measure of the phase lag or lead of the output of said carrier wave generator with respect to the phase of the transmitted carrier wave, reversible counting means integrating the respective lag and lead indications from said logic circuitry, and means responsive to overflows from said counting means actuating said phase-shift circuit incrementally.

References Cited

UNITED STATES PATENTS

| | | | |
|---|---|---|---|
| 3,162,724 | 12/1964 | Ringelhaan | 178—68 |
| 3,238,299 | 3/1966 | Lender | 178—68 |
| 3,242,262 | 3/1966 | Melas et al. | 178—66 |
| 3,344,352 | 9/1967 | Daguet | 178—68 X |

ROBERT L. GRIFFIN, *Primary Examiner.*

J. TERRY STRATMAN, *Assistant Examiner.*

U.S. Cl. X.R.

178—88; 325—30, 38, 60, 320, 321